US009882443B2

(12) United States Patent
Cortada Acosta

(10) Patent No.: US 9,882,443 B2
(45) Date of Patent: Jan. 30, 2018

(54) DIRECT-DRIVE WIND TURBINES

(71) Applicant: ALSTOM RENEWABLE TECHNOLOGIES, Grenoble (FR)

(72) Inventor: Pere Cortada Acosta, Sant Cugat del Vallès (ES)

(73) Assignee: ALSTOM Renewable Technologies, Grenoble (FR)

( * ) Notice: Subject to any disclaimer, the term of this patent is extended or adjusted under 35 U.S.C. 154(b) by 0 days.

(21) Appl. No.: 14/860,613

(22) Filed: Sep. 21, 2015

(65) Prior Publication Data
US 2016/0094100 A1  Mar. 31, 2016

(30) Foreign Application Priority Data

Sep. 26, 2014  (EP) ..................... 14382369

(51) Int. Cl.
H02K 1/30 (2006.01)
F03D 9/00 (2016.01)
(Continued)

(52) U.S. Cl.
CPC ............ *H02K 1/30* (2013.01); *F03D 1/0691* (2013.01); *F03D 15/20* (2016.05); *H02K 7/088* (2013.01);
(Continued)

(58) Field of Classification Search
CPC .. H02K 1/30; F03D 15/20; F03D 3/00; F03D 1/0691; Y02E 10/74
See application file for complete search history.

(56) References Cited

U.S. PATENT DOCUMENTS 6,975,045 B2 * 12/2005 Kurachi ................. H02K 7/183
290/44
7,098,552 B2 * 8/2006 McCoin ................. F03D 1/025
290/44
(Continued)

FOREIGN PATENT DOCUMENTS

WO  WO 2009070333 A1 *  6/2009  ............ F03D 9/002
WO  WO 2012/138725 A1    10/2012

OTHER PUBLICATIONS

European Search Report for EP 14382369.8, dated Mar. 27, 2015, 8 pgs.

Primary Examiner — Viet Nguyen
Assistant Examiner — Joseph Ortega
(74) Attorney, Agent, or Firm — Dority & Manning, P.A.

(57) ABSTRACT

A direct-drive wind turbine comprises a wind turbine rotor and a generator mounted on a frame. The wind turbine rotor comprises a hub carrying blades and the generator comprises a generator stator comprising a track structure and a stator surface connected to the track structure, wherein the stator surface has coil windings, and carriages connected one after the other and adapted to run on the track structure, wherein the carriages carry an electrically magnetically active material facing the stator surface such that when the carriages run along the track structure a magnetic field is generated across an air gap provided between the carriages active materials and the stator coil windings, wherein one or more carriages are directly coupled to the wind turbine rotor by rigid connectors such that rotation of the wind turbine rotor causes displacement of the carriages along the track.

13 Claims, 4 Drawing Sheets

(51) Int. Cl.
  *F03D 1/06* (2006.01)
  *H02K 7/08* (2006.01)
  *H02K 7/18* (2006.01)
  *F03D 15/20* (2016.01)

(52) U.S. Cl.
  CPC ......... *H02K 7/1838* (2013.01); *H02K 7/1869* (2013.01); *F05B 2270/706* (2013.01); *Y02E 10/721* (2013.01); *Y02E 10/725* (2013.01)

(56) References Cited

U.S. PATENT DOCUMENTS

| | | | | |
|---|---|---|---|---|
| 7,816,830 B2* | 10/2010 | Dickes | H02K 1/148 | 310/156.12 |
| 8,026,626 B1* | 9/2011 | Meller | F03D 9/002 | 290/55 |
| 8,322,992 B2* | 12/2012 | Fuller | F03D 3/02 | 29/889.7 |
| 8,575,806 B2* | 11/2013 | Kuo | H02K 21/24 | 290/43 |
| 8,786,124 B2 | 7/2014 | Castell et al. | | |
| 8,823,193 B1* | 9/2014 | Yazghi | F03D 7/048 | 290/44 |
| 9,331,531 B2* | 5/2016 | Nadeau | H02K 1/2773 | |
| 2003/0006614 A1* | 1/2003 | Appa | F01D 1/32 | 290/55 |
| 2004/0041409 A1* | 3/2004 | Gabrys | F03D 9/002 | 290/55 |
| 2006/0152015 A1* | 7/2006 | Bywaters | F03D 7/0248 | 290/55 |
| 2008/0106098 A1* | 5/2008 | Miller | F03D 9/002 | 290/44 |
| 2008/0231131 A1* | 9/2008 | Gabrys | H02K 3/47 | 310/114 |
| 2009/0121483 A1* | 5/2009 | Xiong | F03D 7/0272 | 290/44 |
| 2010/0033166 A1* | 2/2010 | Helle | G01R 33/1215 | 324/205 |
| 2010/0085005 A1* | 4/2010 | Palmer | H02K 21/24 | 318/722 |
| 2010/0295316 A1* | 11/2010 | Grassman | F03D 3/005 | 290/55 |
| 2011/0001318 A1* | 1/2011 | Nelson | F03D 7/0272 | 290/44 |
| 2011/0193349 A1* | 8/2011 | Borgen | F03D 1/0658 | 290/55 |
| 2011/0241453 A1* | 10/2011 | Idland | H02K 1/2793 | 310/43 |
| 2011/0260564 A1* | 10/2011 | Rodger | H02K 7/06 | 310/83 |
| 2011/0309625 A1* | 12/2011 | Dehlsen | F03D 1/0666 | 290/55 |
| 2012/0073118 A1* | 3/2012 | Bywaters | H02K 7/1838 | 29/596 |
| 2012/0074712 A1* | 3/2012 | Bursal | F03D 1/025 | 290/55 |
| 2012/0112465 A1* | 5/2012 | Morrison | F03D 9/25 | 290/55 |
| 2012/0126541 A1* | 5/2012 | Meller | F03D 1/025 | 290/55 |
| 2012/0126628 A1* | 5/2012 | Bjerknes | F03D 7/0224 | 307/84 |
| 2012/0134808 A1* | 5/2012 | Lindberg | F03D 80/70 | 416/1 |
| 2012/0146338 A1* | 6/2012 | Teglia | F03D 9/25 | 290/55 |
| 2012/0217831 A1* | 8/2012 | Jore | H02K 1/30 | 310/90 |
| 2012/0261920 A1* | 10/2012 | Aso | F03D 7/0204 | 290/44 |
| 2012/0295450 A1* | 11/2012 | Koplow | H02K 31/02 | 439/18 |
| 2013/0001950 A1* | 1/2013 | Armstrong | F03D 3/065 | 290/55 |
| 2013/0038070 A1* | 2/2013 | Andersen | H02K 1/2786 | 290/55 |
| 2013/0113217 A1* | 5/2013 | Vaz | F03D 3/0409 | 290/55 |
| 2013/0134713 A1* | 5/2013 | Jacob | H02K 7/18 | 290/52 |
| 2013/0207394 A1* | 8/2013 | Banham-Hall | F03D 7/0224 | 290/44 |
| 2013/0243598 A1* | 9/2013 | Ziegler | F03D 7/0224 | 416/147 |
| 2013/0275079 A1* | 10/2013 | Cousineau | G01P 3/481 | 702/145 |
| 2013/0285489 A1* | 10/2013 | Lemma | H02K 1/187 | 310/65 |
| 2013/0292950 A1* | 11/2013 | Ritschel | F03D 9/002 | 290/55 |
| 2013/0320938 A1* | 12/2013 | Deng | H02P 9/02 | 322/90 |
| 2014/0084593 A1* | 3/2014 | Muniz Casais | H02K 1/278 | 290/55 |
| 2014/0132005 A1* | 5/2014 | Fabregat Balboa | F03D 7/0272 | 290/55 |
| 2014/0167894 A1* | 6/2014 | Jajtic | H02K 1/02 | 335/297 |
| 2014/0191624 A1* | 7/2014 | Jahshan | H02K 35/02 | 310/68 B |
| 2014/0265696 A1* | 9/2014 | Copeland, Jr. | H02K 21/44 | 310/154.02 |
| 2014/0284932 A1* | 9/2014 | Sharkh | F03B 13/105 | 290/54 |
| 2014/0312625 A1* | 10/2014 | Castell Martinez | F03D 9/25 | 290/55 |
| 2015/0155761 A1* | 6/2015 | Richard | H02K 11/0073 | 310/68 D |
| 2015/0211490 A1* | 7/2015 | Airoldi | F03D 80/00 | 290/1 B |
| 2015/0214824 A1* | 7/2015 | Guina | H02K 19/20 | 310/113 |
| 2015/0222151 A1* | 8/2015 | Semken | H02K 1/148 | 310/216.008 |
| 2015/0322922 A1* | 11/2015 | Himmelmann | F03D 9/25 | 290/55 |
| 2016/0072365 A1* | 3/2016 | Dinulovic | H02K 7/1853 | 340/870.39 |
| 2016/0094100 A1* | 3/2016 | Cortada Acosta | H02K 7/088 | 290/55 |
| 2016/0146180 A1* | 5/2016 | Borns | H02K 7/1807 | 290/1 R |
| 2016/0146193 A1* | 5/2016 | Garvey | F16H 39/01 | 60/682 |
| 2016/0233755 A1* | 8/2016 | Bayrakdar | H02K 53/00 | |

\* cited by examiner

DIRECT-DRIVE WIND TURBINES

This application claims the benefit of European Patent Application 14382369.8 filed on Sep. 26, 2014.

The present disclosure relates to direct drive wind turbines.

BACKGROUND

Modern wind turbines are commonly used to supply electricity to the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

In conventional wind turbines, the gearbox increases the speed of the wind-driven rotor. This reduces the size of the generator required. In the directly driven generators typically used in offshore direct-drive wind turbines, the rotor is generally directly connected to the rotor hub. Direct-drive wind turbines thus comprise generators operating at the same rotational speed as the rotor with wind turbine blades and therefore having a much larger diameter than generators used in wind turbines having a gearbox.

Large direct-drive wind turbines, i.e. with a generator having a diameter of several meters, also have the need for a small and constant rotor/stator air gap in order to maintain efficiency. This rotor/stator air gap should not exceed a few millimetres in order to avoid excessive magnetization requirements. This means that the mechanical construction has to be very rigid in order to maintain the air gap and withstand, among others, the forces of attraction and repulsion between the generator rotor and the generator stator.

In that sense, typically known systems have a generator rotor rotatably mounted with respect to a generator stator by a bearing arrangement (normally a central bearing) and an arrangement of e.g. reinforcing elements/structures in order to enhance the stiffness of the generator rotor and thus avoid or reduce deformations. However, the bearing arrangement and the reinforcing elements can lead to an increase of the weight and of the cost of the structure.

During operation of wind turbines, sudden loads and bending loads on the rotor can be introduced by the wind force acting on the blades. In direct-drive wind turbines these high bending loads can cause structural damage to parts of the generator, e.g. its bearings. Replacement or repair of such generator parts may be very expensive due to e.g. the size of the generator and its components and to related dismantling costs. Furthermore, such loads can deflect the generator rotor in such a way that the air gap width is changed or becomes non-uniform. If the air gap width becomes too small, the generator rotor and stator components can hit each other potentially damaging the generator.

Document WO2012138725 provides a mechanical assembly for maintaining an air gap between a stator and a rotor in an electromechanical energy converter through the use of a plurality of rotor sections that are flexibly coupled to the hub and enclosed in a structural sleeve. However, such systems may still have significant weight and cost.

There thus still exists a need for further improved direct-drive wind turbines.

SUMMARY

In a first aspect, a direct-drive wind turbine is provided. The direct-drive wind turbine comprises a wind turbine rotor and a generator mounted on a frame. The wind turbine rotor comprises a hub carrying a plurality of blades. The generator comprises a generator stator comprising a track structure and a stator surface connected to the track structure, wherein the stator surface has coil windings. And the generator further comprises a plurality of carriages connected one after the other and adapted to run on the track structure. The carriages carry an electrically magnetically active material arranged facing the stator surface such that when the carriages run along the track structure a magnetic field is generated across an air gap provided between the magnetically active materials of the carriages and the coil windings of the stator structure. And one or more carriages are directly coupled to the wind turbine rotor by one or more rigid connectors such that rotation of the wind turbine rotor causes displacement of the carriages along the track.

According to this first aspect, the wind turbine rotor, i.e. any of the hub or the blades (or extender when present), is directly coupled to the carriages by rigid connectors. This ensures that rotation of the wind turbine rotor is directly transmitted to the carriages. Furthermore, since the carriages comprise e.g. runners so as to be able to run along the track structure, the rotation of the wind turbine rotor is directly transmitted to the carriages without the need for any type of bearing arrangement and central structure. In other words, all generator active parts are supported by a single structure, the stator structure, which does not rotate thus substantially avoiding rotating structural parts. This reduces weight and cost of the structure. Maintenance costs are also reduced as replacing damaged bearings is a substantially cumbersome and expensive task.

In addition, the fact that the carriages are adapted to run along the track that is mounted on or forms part of the stator ensures that the carriages copy the track structure shape (path) thus maintaining substantially stable, or within certain tolerances, the air gap between the magnetically active materials of the carriages and the coil windings of the stator structure even if the track structure suffers from deformations e.g. resulting from bending loads transmitted by the wind turbine rotor or arising from imperfections during the manufacturing process.

In some examples, the electrically magnetically active material may be selected from the group consisting of permanent magnets and coil windings.

In some examples, the carriages may comprise one or more pairs of runners, each pair having an inner and an outer runner, the inner runner being able to run on one side of the track structure and the outer runner being able to run on an opposite side of the track structure. In these cases, "inner" should be understood as located internally from the stator track structure and "outer" should be understood as located externally from the stator track structure.

By providing runners able to run on two opposite sides of the track structure the carriages can not only run along the track, but they can remain "hanging" from the track. This enhances stability of the carriages running on the track thus avoiding or at least minimizing the need for further additional structure (traditionally a central structure with bearings) for supporting the carriages. Furthermore, by providing inner and outer runners at opposite sides of the track, the carriages ("generator rotor") can be mounted internally or externally from the track structure ("generator stator"). It can thus be a quite versatile structure.

In some examples, the pairs of runners may further comprise a side friction wheel to improve engagement of the carriages on the track and ensure the carriages do not go off the side.

In some examples, the track structure may be deformable under operational loads. This way under extreme load cases such as those resulting from e.g. wind gusts, the track can deform and avoid vibrations.

BRIEF DESCRIPTION OF THE DRAWINGS

Non-limiting examples of the present disclosure will be described in the following with reference to the appended drawings, in which.

DETAILED DESCRIPTION OF EXAMPLES

All throughout the figures the same reference numbers will be used to denote the same or very similar elements.

Figure 1:
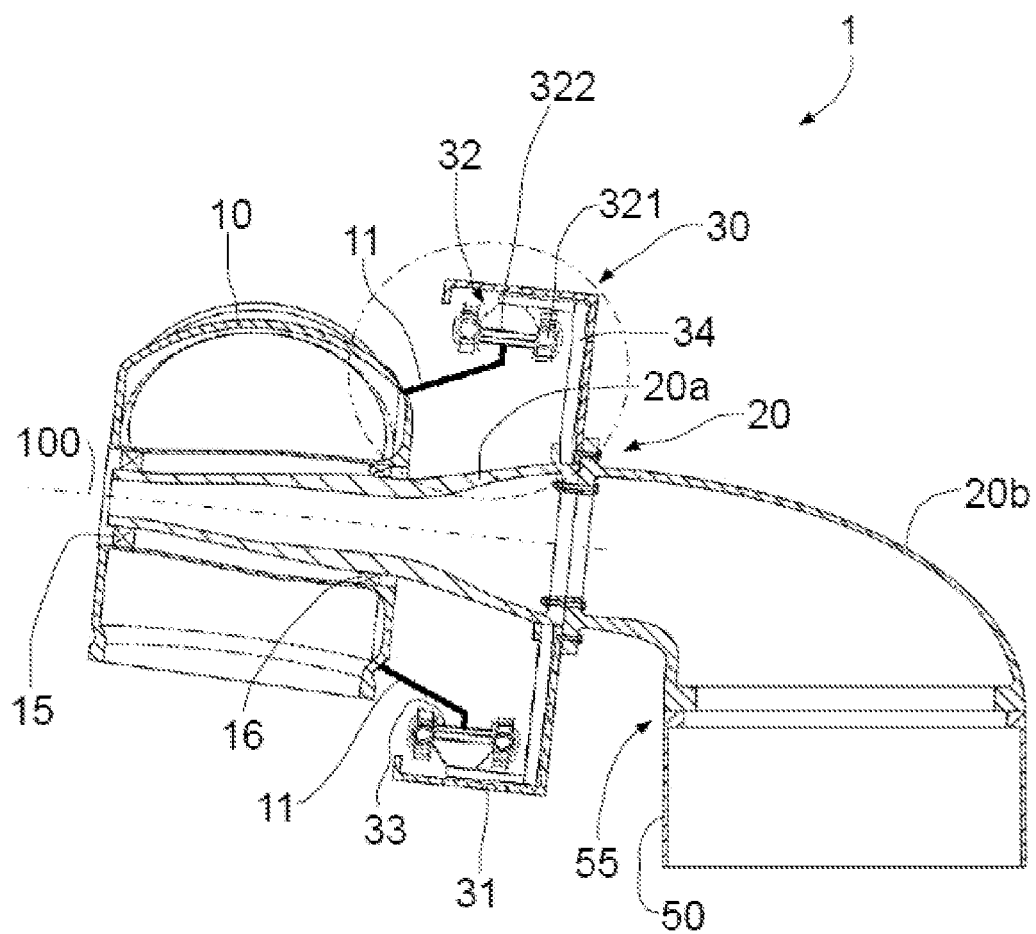
FIG. 1 shows a cross-sectional view of part of a wind turbine according to an example.

FIG. 1 shows a cross-sectional view of part of a wind turbine 1 according to an example. The wind turbine 1 may comprise a tower 50 upon which a frame 20 may be rotatably mounted. In this example, the frame 20 may comprise two separate sections: a front frame 20a and a rear frame 20b. Reference sign 55 indicates that a yaw mechanism may be provided, which allows the rear frame 20b to be rotated around a longitudinal axis of the wind turbine tower 50. The rear 20b and front 20a frame may comprise inward annular flanges and bolts may be used to connect these flanges and connect both frame sections. Other ways of connecting these two sections may be foreseen. Alternatively, the frame may be separated in more sections or it may even be a single piece.

The rotor hub 10 may be rotatably mounted on the front frame 20a through bearings 15 and 16. The rotor hub 10 may carry a plurality of blades (not shown). A generator 30 may also be mounted on the frame 20. A generator housing 31 may be connected e.g. through bolts to an annular flange provided on e.g. the rear frame 20b. An aspect of a hub rotatably mounted on a frame is that the transfer of bending loads (especially due to the weight of the rotor overhanging structure) and transversal and axial loads from the rotor hub to the generator can be avoided or at least substantially reduced as these loads can be transmitted directly from the hub through the frame to the tower. And this load reduction contributes to maintaining substantially constant the generator rotor-stator air gap. In alternative examples, the rotor hub may be mounted on a shaft that may be rotatably mounted on a frame.

Generator stator 32 may comprise a pair of rails 321 that may be mounted in parallel, side by side along a wind turbine rotor rotational axis 100 and distanced apart by a stator surface 322 having coil windings. In other words, the rails 321 may be arranged on a front and a rear side of the stator surface 322. In these cases, "front side" should be understood as the side facing the hub and "rear side" should be understood as its opposite side. The stator surface 322 may hang from a support 34 fixed to the frame 20, the generator housing 31 or both.

Figure 2:
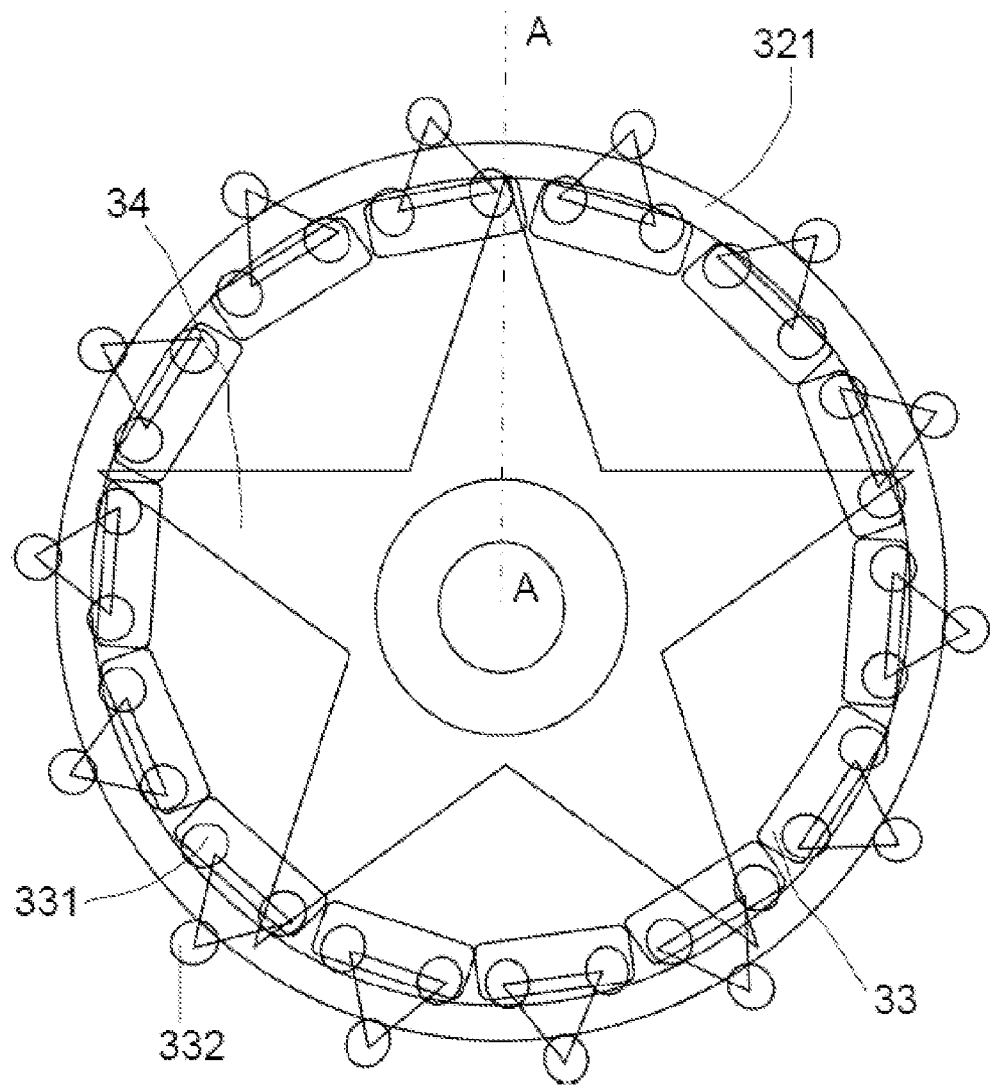
FIG. 2 shows a frontal view of a wind turbine generator according to an example.

A generator rotor may be formed by a plurality of carriages 33 that may be connected one after the other and that may be adapted to run on the rails 321 (see FIG. 2). The carriages 33 may carry an electrically magnetically active material, which may include e.g. permanent magnets or windings arranged facing the coil windings of the stator surface 322. This way, when the carriages 33 run along the rails 321 a magnetic field is generated across an air gap provided between the magnetically active materials of the carriages 33 and the coil windings of the stator structure 322.

In this example, the rotor hub 10 may be connected to the carriages 33 by rigid arms 11. In this example, the rigid arms may extend axially and substantially radially. In alternative examples, the rigid arms may be mounted at extenders mounted on the hub or even at the blades. In still further alternative examples, the rotor hub may be connected to the carriages by tensioned cables, tensioned wires or radial spokes. In all cases rigid connectors are required so as to be able to transfer rotation of the hub to the carriages, i.e. any torque transmitting means able to further withstand loads. This way, rotation of any of the wind turbine rotor parts is directly transmitted to the carriages thus the magnetically active materials carried by the carriages rotate with respect to the rails and the stator surface, i.e. with respect to the coil windings. A magnetic field can thus be created there between.

FIG. 2 shows a frontal view of the generator according to an example. In this example, the generator stator may comprise a pair of rails 321 (only one visible) substantially as described in connection with FIG. 1. In alternative examples other track structures may be foreseen even a monorail structure. In this example the rails 321 may define a substantially circular path and may be tubular i.e. having a circular profile/cross-section. In alternative examples, other path shapes may be foreseen and other rail profiles such as the typical I-beam rail among others may also be foreseen.

FIG. 2 clearly shows that the carriages 33 may be connected one after the other. In this example, the carriages 33 may occupy substantially the whole circumference of the track structure, i.e. close the circle. Further in this example, the carriages 33 may have three wheels in correspondence with each rail 321, two inner wheels 331 (wheels facing the carriage in this example) and one outer wheel 332 (wheel at the opposite rail side in this example). The provision of wheels at two opposite sides of the rail provides stability to the carriages running on the rail thus avoiding or at least minimizing the need for an additional structure for supporting the carriages. The rails thus have a double function, guiding and supporting the carriages. In further examples, other number of wheels may be provided as long as there are two wheels at opposite sides of each rail. Alternatively, sliding skids may be used or any other suitable runner able to run along a track or rail.

Figure 3:
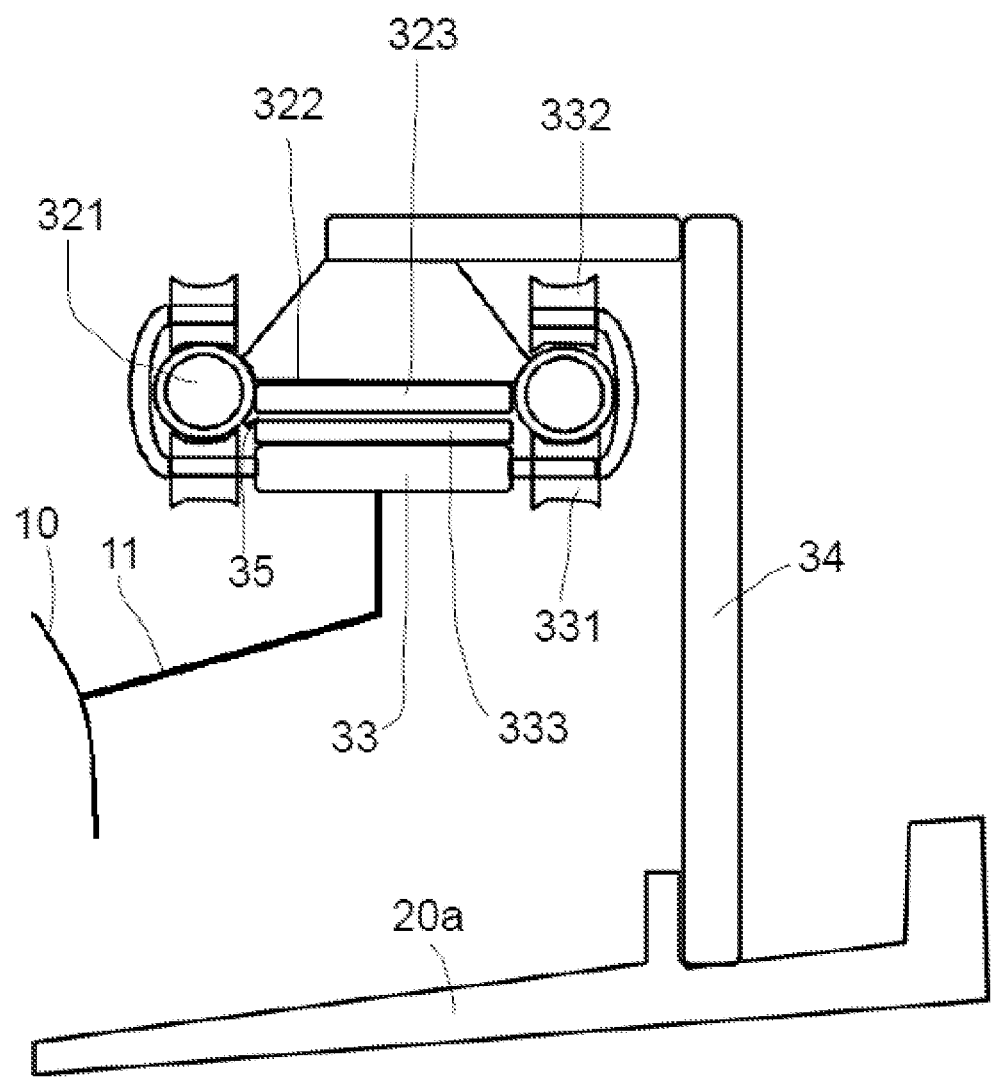
FIG. 3 shows a cross-sectional view along line A-A of FIG. 2.

FIG. 3 shows cross-sectional view along line A-A of FIG. 2 which also corresponds to an enlarged view of the detail encircled by a dashed line of FIG. 1. The generator housing has been removed in order to clearly show what is inside. The rails 321 may have a circular profile and may be spaced apart along a wind turbine rotor rotational axis by the stator surface 322. As mentioned above, coil windings 323 may be provided on the stator surface 322. FIG. 3 also shows that the carriages 33 may be arranged inside the generator stator 32 (inside the rails) and may carry an electrically magnetically active material 333 arranged facing the stator surface 322, in particular facing the coil windings 323 provided on the stator surface 322. FIG. 3 further shows that an air gap 35 may be provided between the electrically magnetically active material 333 and the coil windings 323. Because the carriages travel along the rails and follow its shape, this configuration also ensures the maintenance of this air gap substantially constant even when bending loads are transmitted, i.e. when deformations of the stator structure may occur.

Figure 4:
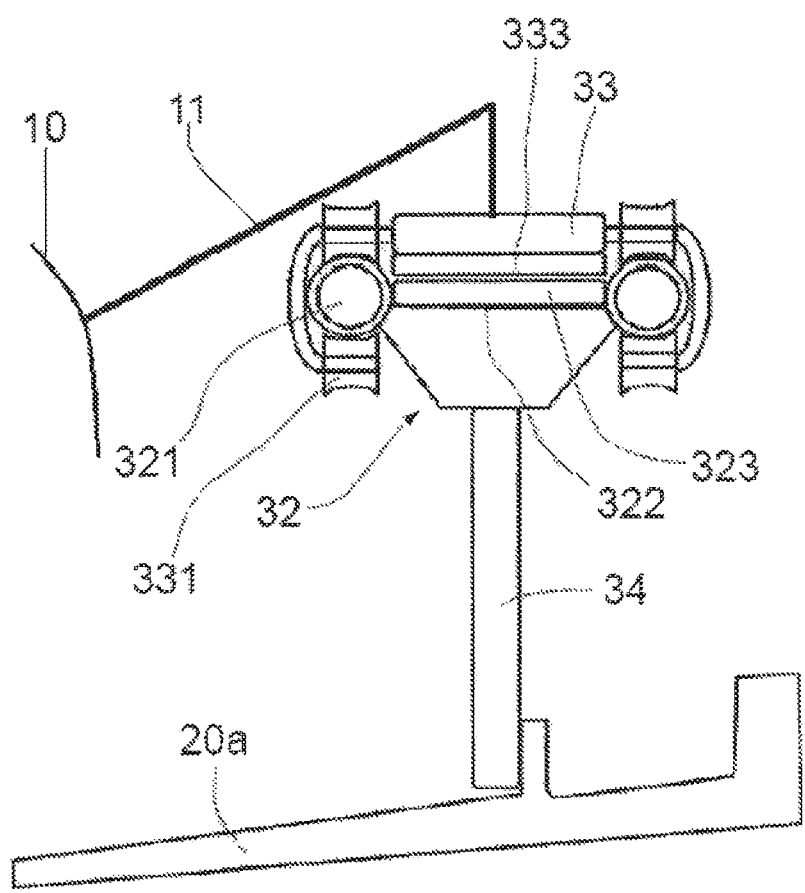
FIG. 4 shows a cross-sectional view similar to that of FIG. 3 according to another example.

FIG. 4 shows a cross-sectional view similar to that of FIG. 3 but according to another example. The example of FIG. 4 differs from that of FIG. 3 in that the carriages 33 may be arranged outside of the generator stator 32.

In some examples, the carriages may further comprise a side friction wheel to improve its engagement on the track and ensure they do not go off the side. In these cases, the carriages may comprise wheels (or runners) on one side of the track (rail) and the side friction wheel or they may comprise wheels/runners on two opposite sides of the track substantially as hereinbefore described and the side friction wheel.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A direct-drive wind turbine, comprising:
a wind turbine rotor and a generator mounted on a stationary frame, wherein the wind turbine rotor comprises a hub carrying a plurality of blades; and
the generator comprising
a generator stator comprising an annular track structure and a stator surface connected to the track structure, wherein the stator surface has coil windings, the track structure parallel to and extending from an annular side of the stator surface,
a generator rotor comprising a plurality of separate carriages linked together one after the other around an entire circumference of the track structure, each carriage in independent running engagement with opposite radial sides of the track structure, wherein the carriages carry an electrically magnetically active material arranged facing the stator surface such that when the carriages run along the track structure a magnetic field is generated across an air gap provided between the magnetically active material of the carriages and the coil windings of the stator structure,
wherein less than all of the carriages are directly coupled to the wind turbine rotor by one or more separate rigid connectors such that rotation of the wind turbine rotor causes all of the linked together carriages to run along the track structure while isolating the generator stator from rotation; and
wherein the generator stator is affixed directly to and supported by the stationary frame and the generator rotor is supported by the stationary frame via the track structure.

2. The wind turbine of claim 1, wherein the carriages comprise one or more pairs of runners, each pair having an inner and an outer runner, the inner runner being in running engagement with one of the radial sides of the track structure and the outer runner being in running engagement with the other of the radial sides of the track structure.

3. The wind turbine of claim 2, wherein the pairs of runners further comprise a side friction wheel.

4. The wind turbine of claim 2, wherein the runners are wheels.

5. The wind turbine of claim 2, wherein the runners are sliding skids.

6. The wind turbine of claim 1, wherein the carriages comprise two or more pairs of runners.

7. The wind turbine of claim 1, wherein the carriages are arranged one after another to occupy substantially the whole of a circumference of the track structure.

8. The wind turbine of claim 1, wherein the track structure comprises a pair of rails mounted in parallel, side by side along a wind turbine rotor rotational axis and arranged on a front and a rear side of the stator surface.

9. The wind turbine of claim 8, wherein each of the rails comprises a substantially circular cross-section.

10. The wind turbine of claim 1, wherein the track structure is deformable under operational loads.

11. The wind turbine of claim 1, wherein the hub is mounted on the frame such that the hub is rotatable with respect to the frame.

12. The wind turbine of claim 1, wherein the rigid connectors are selected from the group consisting of radial spokes, rods and tensioned wires or cables.

13. The wind turbine of claim 1, wherein the carriages are directly coupled to the wind turbine rotor without a central structure.

* * * * *